Sept. 2, 1941.  J. W. BRYCE  2,254,932
STATISTICAL MACHINE
Filed May 11, 1938   6 Sheets-Sheet 1

INVENTOR
James W. Bryce
BY W. M. Wilson
ATTORNEY

Sept. 2, 1941.	J. W. BRYCE	2,254,932
STATISTICAL MACHINE
Filed May 11, 1938	6 Sheets-Sheet 2
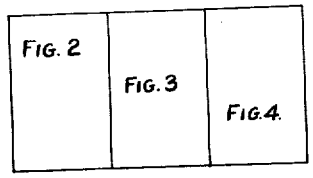
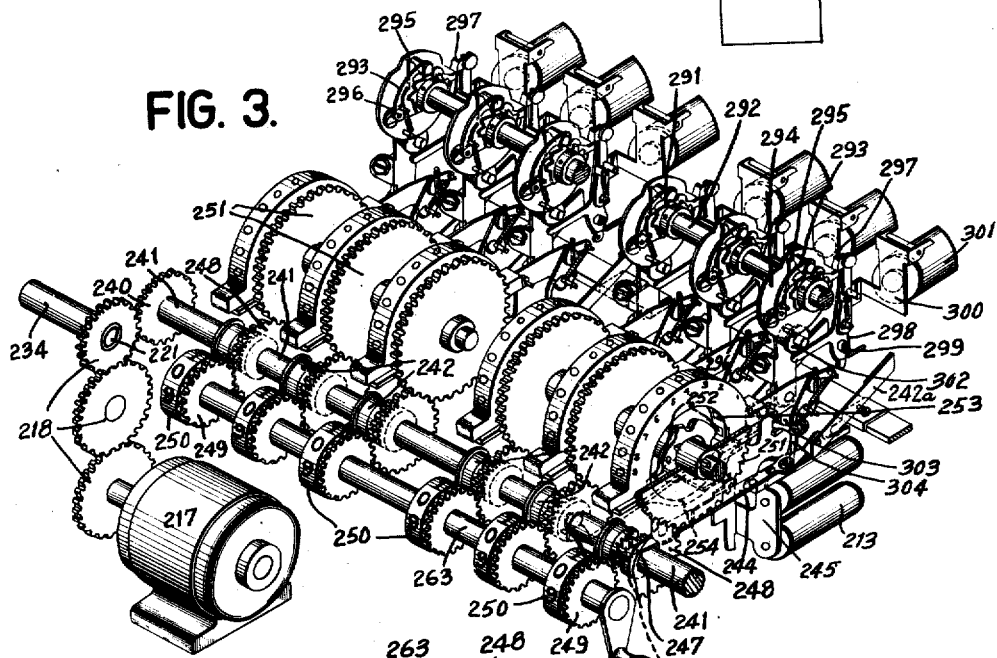
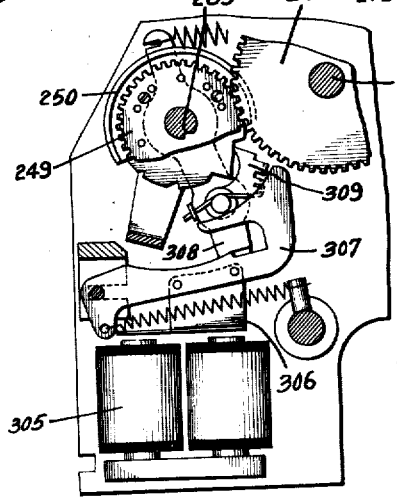
INVENTOR
James W. Bryce
BY
ATTORNEY Sept. 2, 1941.  J. W. BRYCE  2,254,932
STATISTICAL MACHINE
Filed May 11, 1938  6 Sheets-Sheet 3

INVENTOR
James W. Bryce
BY
W. M. Wilson
ATTORNEY

Sept. 2, 1941.   J. W. BRYCE   2,254,932
STATISTICAL MACHINE
Filed May 11, 1938   6 Sheets-Sheet 4

INVENTOR
James W. Bryce
BY
ATTORNEY

Sept. 2, 1941.  J. W. BRYCE  2,254,932
STATISTICAL MACHINE
Filed May 11, 1938  6 Sheets-Sheet 5
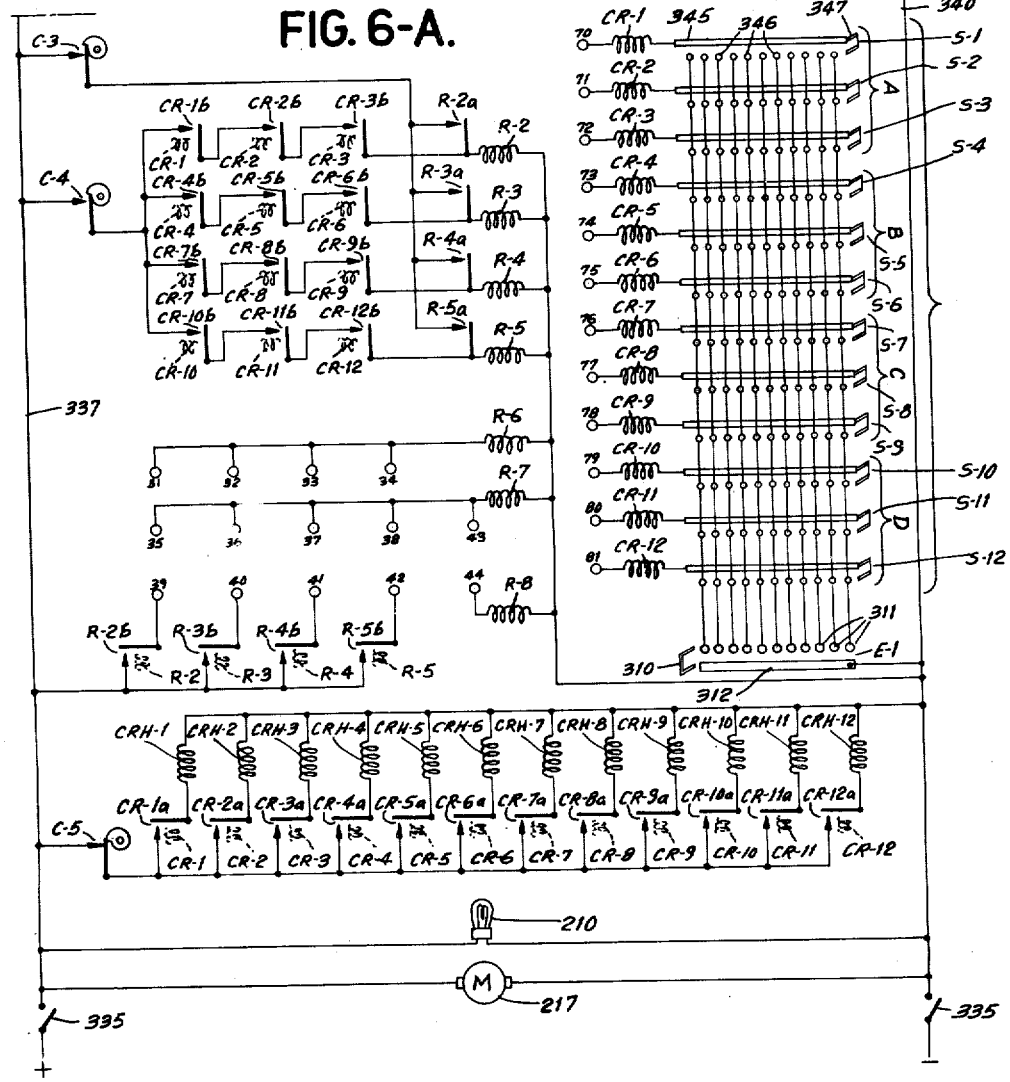
FIG. 6-A.
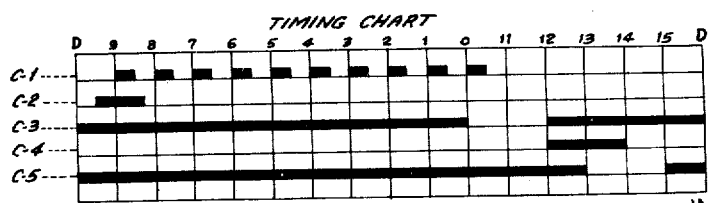
FIG. 7.
INVENTOR
James W. Bryce
BY
ATTORNEY Sept. 2, 1941.    J. W. BRYCE    2,254,932
STATISTICAL MACHINE
Filed May 11, 1938    6 Sheets-Sheet 6
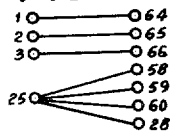
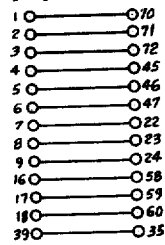
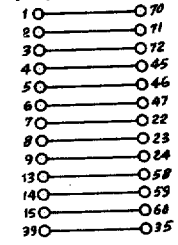
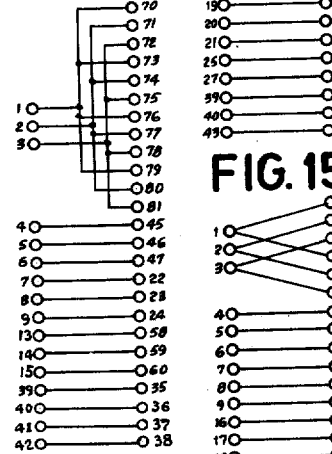
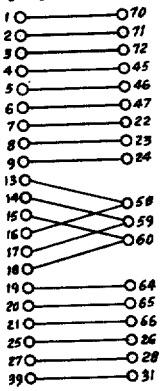
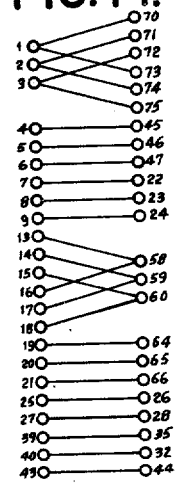
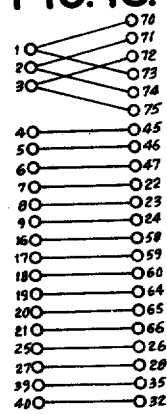
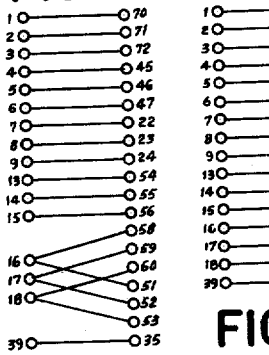
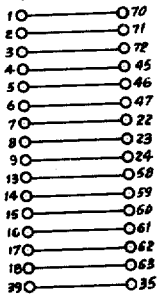
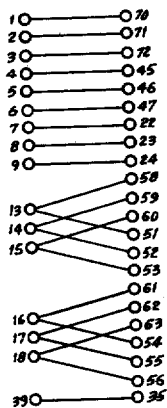
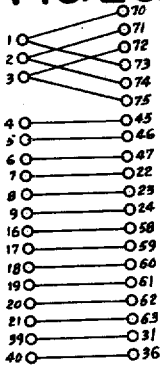
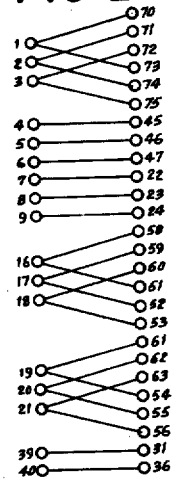
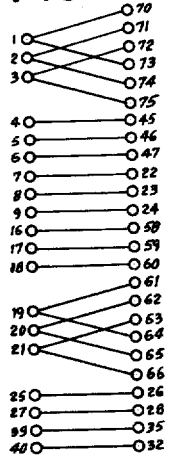
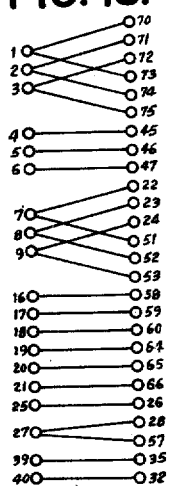
INVENTOR
James W. Bryce
BY
ATTORNEY Patented Sept. 2, 1941

2,254,932

UNITED STATES PATENT OFFICE 2,254,932

STATISTICAL MACHINE

James W. Bryce, Glen Ridge, N. J., assignor to International Business Machines Corporation, New York, N. Y., a corporation of New York Application May 11, 1938, Serial No. 207,282

2 Claims. (Cl. 235—61.7)

This invention relates to improvements in statistical machines and more particularly to improvements in such machines which are adapted to be controlled by light modifying control elements such as photographic film records. Such controlling film records may be provided with machine control representations of various data characterizations so as to provide an imperforate and more compactly organized control record for controlling such machines than perforated statistical machine control cards through which sensing elements extend for controlling such machines.

One of the objects of the present invention resides in the provision of a statistical machine adapted to derive data from a photographic or film control record and to use such data for controlling statistical operations only when the data derived from the control record bears a predetermined relation to selected predetermined data.

Another object of the present invention is the provision of means to control selectively the control means of data manifesting or receiving means when the data derived from the control record bears a predetermined relation to certain selected predetermined data.

Another object of the present invention is the provision whereby the data receiving means is controlled subtractively by the data derived from the film control record.

Another object is the provision whereby the data receiving means is controlled additively or subtractively dependng solely upon sensing predetermined data representations on the film control record.

Another object is the provision of settable means to retain certain select data and comparing the sensed data representations on the film record thereto to control selectively data receiving means when the compared data bears a predetermined relationship to each other. Provision is also made whereby for the said conditions the data receiving means is adapted to be controlled additively or subtractively.

Another object is the provision of control circuits adapted to be energized only by predetermined data derived from the film control record to control selectively the operation of data manifesting means such as data accumulating means and printing means.

Still another object is the provision whereby the data manifesting means is controlled additively or subtractively in accordance with predetermined data representations sensed on the film record and controlled to print all the data added or subtracted and indicating positively certain of the data effective to control the manifesting means.

Still another object is the provision whereby certain data sensed on the control record is stored or retained while the relative relationship of certain other data thereon is determined to condition the receiving means so as to be controlled by the stored data.

Still another object is the provision whereby the data receiving means is controlled in a predetermined manner as long as the data representations sensed in the successive groups of representations on the film control record are similar.

The method described herein to attain the said objects is an embodiment solely to illustrate the principles incorporated in the present invention and comprises advancing the control record, such as a photographic control record having light modifying areas disposed thereon representing predetermined data, to a single analyzing station and effecting sensing of the data representations by modifying light rays thereat thereby conditioning light responsive means accordingly; whereupon comparing operations are effected to determine the relative relationship of certain of the sensed data with respect to other predetermined selected data and simultaneously therewith storing certain of the data sensed to control at a later timed interval data means in a predetermined manner wholly determined by the relative values of the compared data.

The said comparing operations may be effected by comparing the sensed data with selected data retained in settable devices so as to determine the relative relationship of the data in the different groups of data successively presented to the analyzing station. Various control circuits may then be selected upon completion of the comparing operations and in accordance therewith to condition certain control elements of the data receiving means, such as the adding, subtracting or printing control elements, so that the said conditioned control elements may be operated in accordance with the said data stored in suitable data storing means.

In this manner the data receiving means may be controlled additively and/or subtractively depending upon the relative values of the control data sensed, and in addition thereto printing operations may be effected to list all the data effective to control the adding and subtracting operations and indicating positively the data effective to control one of the said operations.

In the drawings:

Figs. 2, 3 and 4 show diagrammatically the control units of the statistical machine when arranged as shown in Fig. 8 and wherein Fig. 2 shows the film control record advancing and sensing means; Figs. 3 and 3A show the data accumulating means wherein Fig. 3A shows the elusive one control mechanism and Fig. 4 shows the data recording means.

Figure 6:
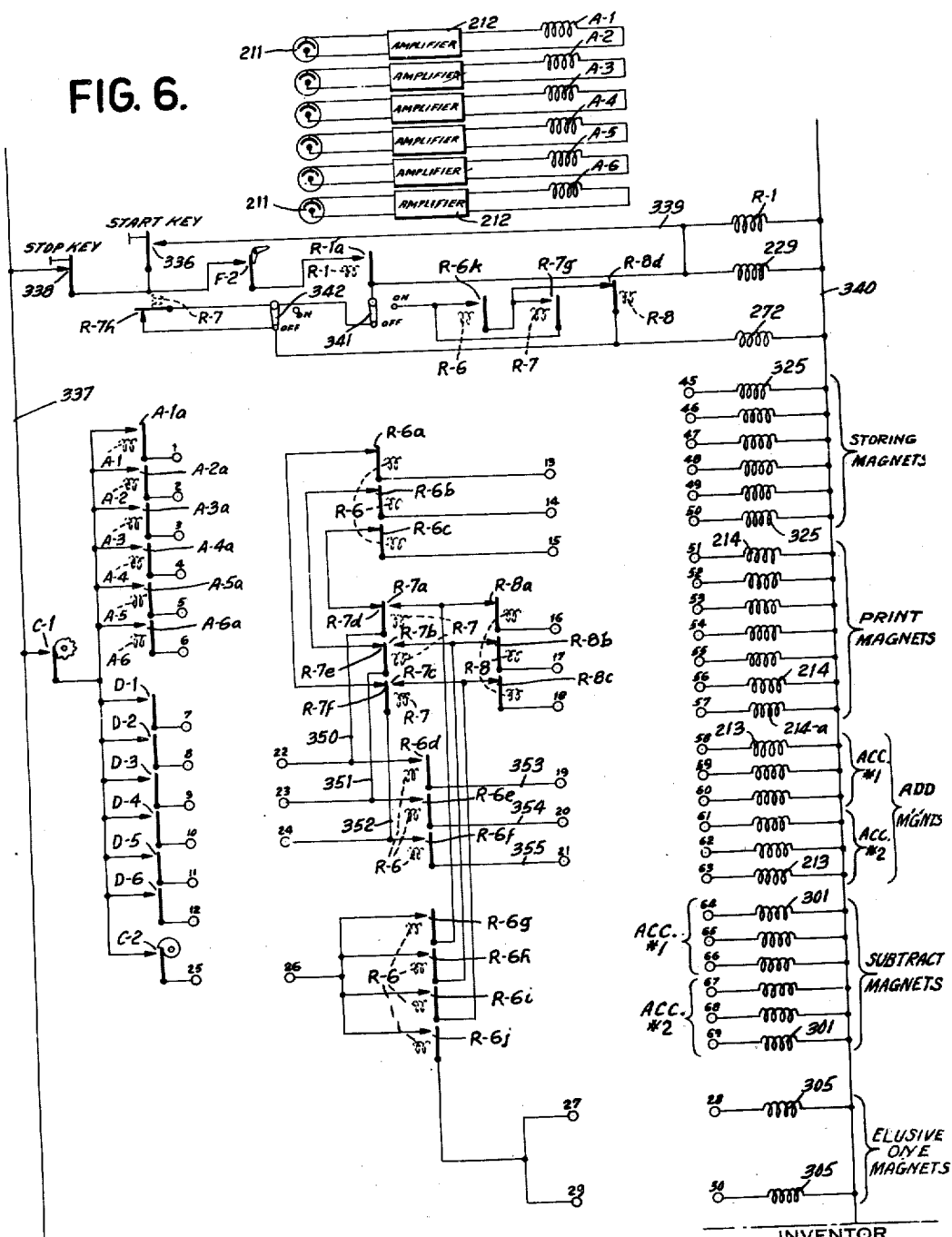

Figs. 6 and 6A when arranged as shown in Fig. 8A show a method of connecting certain of the control elements of the statistical machine.

Fig. 7 is a timing chart of the operations of certain of the control elements.

Figs. 8 and 8A show the layout of Figs. 2 to 4 and Figs. 6 and 6A respectively.

Figs. 9 to 23 show different plugging arrangements of the control elements indicated in Figs. 6 and 6A.

Before describing the improved statistical machines which form the subject matter of the instant application, the photographic film controlling element forming the subject matter of the co-pending application Serial No. 207,281, filed May 11, 1938, will be described briefly.

Film control record

Figure 1:
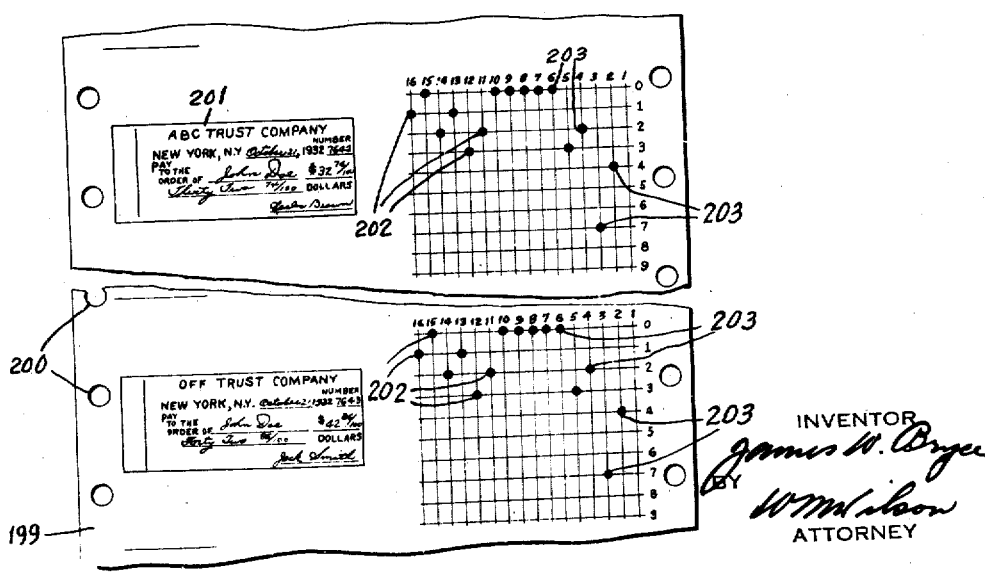
Fig. 1 represents an enlarged view of a section of a photographic film controlling element for a statistical machine.

Referring now to Fig. 1 wherein a fragmentary section of the photographic film controlling element is shown and generally designated 199, the perforations designated 200 represent the feed apertures in the film. The data represented at 201 represents a photographic facsimile representation of a document, such as a bank check, and the spot representations designated by the reference numeral 202 represent amounts which may be derived from hand set-up devices of a calculating machine or from any suitable source.

In practice, such data representations may be used to designate the depositor's number or like data and may represent or be indicative of certain classification data. The data represented by reference character 203 represents numerical data which may be obtained from different suitable sources, for example, it may be entered from the keyboard of the calculating machine. In the delineated illustration such data 203 represents the amount of the check represented at 201.

It may be understood that the completed film has photographic reproductions thereon at successively spaced intervals along the film and that the reproductions are in extremely compact form. Accordingly, a large quantity of statistical information can be placed on an extremely small controlling record. The films used may be negative films or films which during development are reversed to positive. The film delineated is a positive.

The spot representations 202 and 203 are photographic machine control spot representations and each set of numerical data comprises one or more control spots in such relative position upon the film record as to represent by their relative position thereon the numerical control value thereof when the film record is trans-illuminated in the statistical machine. In practice and according to the embodiment shown, such numerical spot representations are shown on the film in index point relation in general conformance with the manner in which index perforations are disposed on perforated record cards in the Hollerith accounting system. That is, the differential position of a control spot photographic representation delineates the numerical value of a particular numeral.

In the use of the improved controlling record in a statistical machine the film may be fed through the machine in any suitable manner and trans-illuminated and scanned to ascertain the control value of the control representation in a row or of control representations in a plurality of rows. The controlling record is effective to modify the rays of light to establish different control circuits which in turn are effective to control the operation of the statistical machine control elements. It is recognized that the control circuits and the statistical machine control elements may differ in structural arrangement and form from the illustrative devices shown in the accompanying drawings which, it is believed, represent the simplest arrangement showing the method of controlling statistical elements in accordance with coded indications or representations appearing on light modifying control records.

First, a description will be given of one method of accumulating the different items and data represented by the coded indications on the control records, including briefly a disclosure, how, in lieu of or in addition to accumulating the said data, control elements may be provided or employed so that the data characterizations scanned or analyzed on the control records may be imprinted upon a suitable sheet or record. Following this, a description will be given of a method of controlling automatically the auxiliary operations of the statistical machine from the coded indications appearing on the control record, for example, automatically controlling the machine in a definite manner depending on whether or not certain of the coded indications on the control records are in agreement with predetermined data stored in suitable settable devices included in the machine. Other examples of different controlling operations will follow thereafter.

Continuing now with the description and referring to Figs. 2, 3 and 4 (arranged as shown in Fig. 8) and Fig. 6, the film record, generally designated 199, is shown to be arranged to be advanced in the direction indicated by the arrow so that the control representations or spots are presented to a sensing or analyzing station where the film is trans-illuminated by a suitable light source 210. The rays of light are modified by the control spots to control the action of the light responsive device or cells 211 which in turn affect the action of the associated amplifying units 212. Control circuits including controlling relays A—1 to 6 are conditioned by the corresponding amplifier units to control the operation of said relays which in turn are effective to render operative the accumulating means control magnets and/or the printing means control magnets.

The principle of operation of the disclosed statistical machine is based on the fact that the film record having control representations thereon is presented to a sensing station and the said representations are analyzed while the film is in motion to initiate differentially timed electrical impulses in accordance with the disposition of the representations to control data accumulating and/or data printing mechanisms; said mechanisms adapted to be operated in synchronism with the film record advancing and sensing means so that upon initiation of the differentially timed impulses which control the operation of the mechanisms, the data entered in the accumulating mechanism and the data recorded by the printing mechanisms correspond to the coded data control representations sensed. It is to be understood that the present specific type of system is merely an example of the principles of controlling a statistical system.

Figure 2:
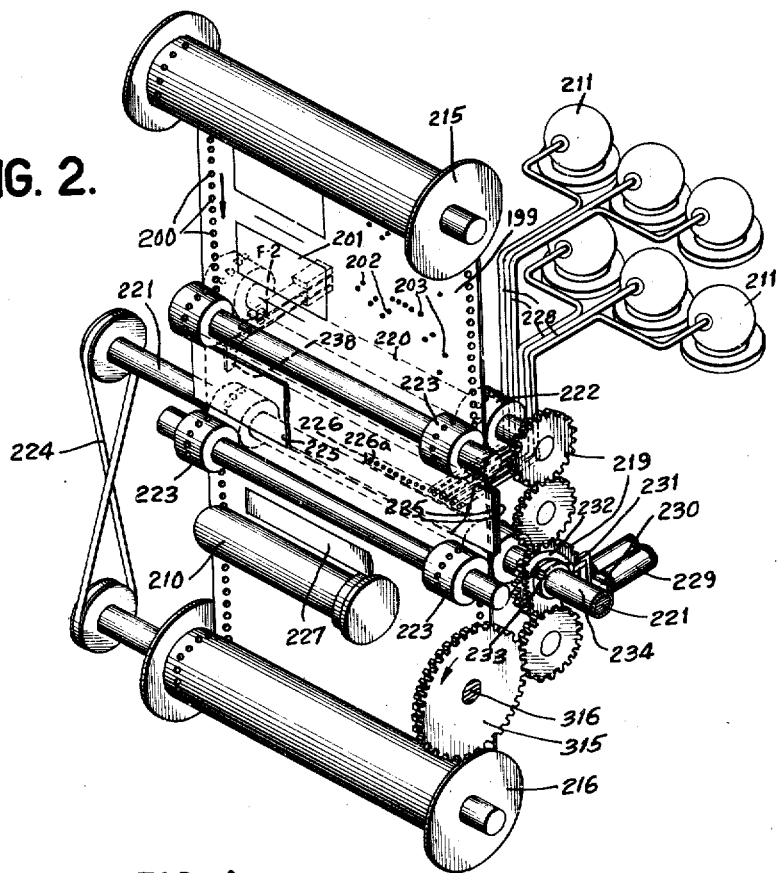
Figure 4:
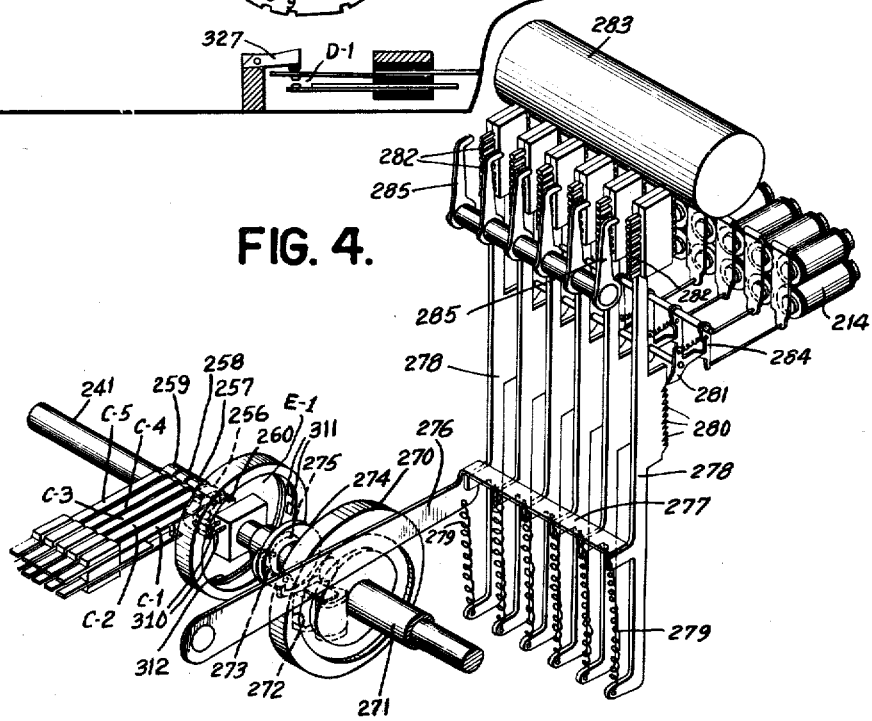

The statistical machine shown in Figs. 2, 3 and 4 comprises generally three units, namely, the film record advancing and sensing unit, the accumulator unit and the printing unit. Each unit as illustrated shows only the main control elements thereof as well as the main connections between all the units; however, the units are operated in synchronism exactly as operated in practice at the present time. The brief description of the machine to follow is believed to be sufficient in view of the fact that the units and method of operation thereof are predicated upon the structures shown in U. S. Patents Nos. 1,534,-531 and 1,976,617 and wherein the accumulating and printing and associated control mechanisms are explained and described in detail.

*Film advancing and data sensing means*

In Fig. 2, the film record 199 is shown disposed on a supply reel 215 and attached to a driven take-up reel 216. The film is advanced through the agency of the motor 217 by means of the driving connections generally designated 218 and 219. The driving connections 219 are secured to the shafts 220 and 221 which have suitable advancing sprockets 222 fixed thereon and adapted to extend through the apertures 200 of the film to cooperate with the complementary rollers 223. A flexible driving connection is provided between the shaft 221 and the take-up reel 216 generally designated 224. It is seen now that by means of the described driving mechanism the film record may be advanced so as to be fed through the guide plates 225 to present the different data representations thereon to a sensing position generally designated 226 whereat the representations are analyzed in the following manner.

The rays of light emanating from the light source 210 are directed upon the film record 199 at the sensing position 226 by means of a suitable condenser 227. The guide plates 225 extend across the entire width of the film and are disposed on both sides thereof. Each of the said plates is provided with a series of apertures 226—a disposed in a transverse line with respect to the film. The apertures are so spaced as to be disposed opposite the individual rows where control spots may appear upon the film record, and are of such dimensions so as to be substantially the same as the control spots. Associated with the film record and in close proximity thereto are suitably disposed a plurality of light conducting quartz rods 228 which extend individually to the light responsive devices or cells 211. The said rods are positioned so that a rod may be provided for each row of control representations disposed on the film, and are arranged so as to extend into the apertures 226—a provided in the associated guide plate 225. Consequently, when there are no control representations or spots interposed between the light source and the light responsive devices or stated in other words, when no control spots are presented to the sensing station or apertures in the guide plates, the rays of light are conducted by each rod to the corresponding light responsive devices to affect the devices in a definite manner. However, whenever a control spot or group of control spots are presented to the sensing station, the said spot or spots are effective to block off at that position the light from the corresponding rod or rods to affect the action of the associated light responsive devices in a different manner. The operation of the control circuits associated with the light responsive devices will be described hereinafter.

Different control devices associated with and forming part of the film advancing means will now be described. A film feed clutch magnet 229 (Fig. 2) is provided to control the feeding or advancing of the film record. Suitably secured to the armature 230 of the said magnet is a stop lever 231 adapted to cooperate with an extension of a pivoted dog member 232 which is mounted on one of the gears of the driving connections designated 219 as shown in the figure. The said dog member when released (upon energization of the magnet 229) cooperates with the clutch member 233 secured to sleeve 234 and the associated gear of the driving connections designated 218. The said gear, sleeve and clutch member are rotatably supported on shaft 221 and rotated continuously as long as the motor 217 is operated. Upon energization of the control magnet 229 the dog 232 is released by the displaced stop lever 231, to engage the clutch member 233 thereby rotating the shafts 220 and 221 in unison with the clutch member by means of the gearing 219. Rotation of the said shafts is now effective to advance the film record 199 from the supply reel 215 to the driven take-up reel 216. It should be stated that control contacts F—2 are provided and suitably disposed so as to be operated by the control lever 236. According to the instant arrangement the said lever is arranged to maintain the contacts F—2 closed as long as the film record is advanced past the lever. In the event of breakage of the film or that the film supply is exhausted, the said lever is then effective to swing out into the plane normally occupied by the film to permit the contacts F—2 to be opened.

*Data accumulating means*

The data accumulating means (Fig. 3) to be described is capable of either adding or subtracting data and is operated in synchronism with the film advancing means by means of the gear 240, secured to the shaft 241, engaging the main driving connections designated 218. Shaft 241, therefore, is rotated continuously as long as motor 217 is operated, and in timed relationship with the rotation of shafts 220 and 221 (Fig. 2). The data adding control mechanism will now be described.

The continuously rotated shaft 241 has slidably mounted thereon but keyed for rotation therewith a plurality of clutch elements 242, there being one for each denominational order of the accumulator. The element 242 is provided with a groove in which fits the end of an arm 243 of a suitably pivoted lever 244. The said lever is normally held in the position shown by armature 245 of the control magnet 213. Upon energization of the control magnet the associated armature is attracted thereto, thereby releasing the lever 244 which is positioned by the leaf spring 242a to cause the clutch element 242 to move into engagement with cooperating teeth 247 integral with a gear 248 loosely mounted on shaft 241. Gear 248, when thus coupled to shaft 241, will rotate a gear 249 which meshes therewith and displace the associated accumulator index wheel 250. Also driven by gear 248 is a gear 251 which is displaced in the same manner as index wheel 250. The ratio of gears 249 and 251 is one to two so that the latter will turn through half a revolution for each revolution of the former gear. Carried by and insulated from gear 251 is a pair of electrically connected brushes 252, one of which cooperates successively with the conducting segments 253 while the other cooperates with an arcuate conducting strip 254. The relationship of the parts is such that when the index wheel 250 is in its zero position, one of the brushes 252 is in contact with the zero segment and the other brush is in contact with the conducting strip, thus forming an electrical connection between the two. The positioning of the said brushes provides a convenient electrical read out mechanism for controlling total printing operations, the method of which is well known in the art.

It is to be understood that the control magnets 213 may be energized at various points in the cycle of the machine, depending upon the disposition of the control representations upon the film detected by the sensing means. This energization may take place in response to the detection of a control representation in any of the index point positions represented by the accumulator. The control representations are disposed on each frame of the film in such a manner, and the film advancing means and accumulator means are operated in such timed relationship that, for example, a control representation sensed in the "9" position, indicated on the film, will cause the clutch element 242 to be tripped to position the index wheel 250 and brushes 252 nine steps before a declutching operation is effected by the machine, and the sensing of control representation in the "1" position will cause the clutch element to be tripped to position the said index wheel and brushes one step before declutching thereof. For further detailed description of the accumulating mechanism reference should be made to the said U. S. Patent 1,976,617 and wherein such well known accumulator operations, as denominational order transfer, restoration of the clutch elements and magnet armatures to normal position and resetting of the accumulator mechanism are specifically described. The resetting mechanism is shown diagrammatically to comprise a manually operated reset crank 255 secured to the shaft 253 carrying gears 249 which when operated restores the index wheels and readout mechanism to normal position in a manner well known in the art.

The data subtracting control mechanism will now be described. Subtracting in the present machine is of the type known in the art as direct subtraction, that is, it is distinguishable from statistical machines in which the amount to be entered is first converted into its complement and then additively entered by the adding mechanism. In the operation of the present accumulator means, the entry of the nines complement of a number to be subtracted is effected by initially tripping all the adding control magnets 213 as though to add nines in each position and permitting the control spot representations to effect de-clutching of the adding mechanism in accordance with the differential positioning of the said representations. This will result in the addition of the nines complement of the number. The elusive one is added into the units order of the accumulator independently to change thereby the nines complement to a tens complement. Subtracting operations of the type referred to are well known in the art, therefore, it is deemed sufficient to present only the following brief description of the subtracting control mechanism. For a detailed description of this mechanism reference should be made to the U. S. Patent 1,976,617 referred to hereinabove.

A plurality of clutch elements 291, one for each denominational order position of the accumulator means, are provided and secured to shaft 292 which is rotated by suitable driving connections so that the shaft 292 rotates two revolutions for one revolution of shaft 241. An individual clutching dog 293 pivotally mounted on cam 294 (freely mounted on shaft 292) cooperates with each clutch element 291; also freely mounted on the said shaft is a triple armed member 295, one of the arms of which engages a pin 296 secured to the free end of dog 293 to hold the latter out of engagement with the driving clutch element 291. Each of the arms of member 295 cooperates in turn with a pawl 297 mounted on the clutch element 298 which is pivoted at 299. The associated pivoted armature 300 of magnet 301 is effective upon energization of the magnet to rock element 298 in a clockwise direction to release member 295 thereby permitting engagement of dog 293 with the driving element 291. Cam 294 will thus be driven in a counterclockwise direction until the next arm of member 295 is engaged by pawl 297, which then causes disengagement of the clutch and interruption of further movement of the cam.

Upon movement of cam 294, the higher concentric portion thereof depresses roller 302 and with it the slider element 303, which engages bell crank 304, to move arm 244 in a de-clutching direction at a time determined by the time of energization of magnet 301.

The mechanism by means of which the elusive one is entered into the accumulator means is illustrated in Fig. 3A and is more fully disclosed in U. S. Patent No. 1,976,617. The units order of the accumulator means has associated therewith a magnet 305, the armature 306 of which is secured to the carry lever latch 307 of the units order so that energization of the said magnet is effective to trip the units point carrying arm 308, whereby, during the carrying period of the machine cycle, the pawl 309 associated with the units order advances the units wheel one step.

*Data printing means*

The printing or listing unit comprises a printing control cam 270 secured to the sleeve 271 rotatably supported by the shaft 241 which is rotated in synchronism with the film record feed mechanism making one revolution for each individual frame fed and analyzed, whenever the list clutch magnet 272 is energized to release the pivoted dog member 273, supported by member 274 which is secured to sleeve 271, to engage the clutch member 275 secured to shaft 241 and continuously rotated thereby rotating the printing cam in unison with the shaft 241.

The member 276 is shown to cooperate with and be actuated by a cam groove in the printing cam so that the printing bail or member 277 is effective to impart an upward movement to the type bars 278 by means of the resilient connections such as springs 279 between the type bars and the printing bail. The type bars are provided with a plurality of ratchet teeth 280 which cooperate with stopping pawls 281 so that the type bars may be interrupted at various positions to present any of their type elements 282 to the printing platen 283 for cooperation therewith.

By virtue of the said spring connections, the type bars may be interrupted without interfering with the upward movement of the printing bail which has an invariable extent of movement controlled by the printing cam. Energization of any one of the control magnets 214 is effective to rock the spring-pressed pivoted latch 284 releasing the associated pawl 281 so that it may swing into engagement with teeth 280 and interrupt the further upward movement of the corresponding type bar 278. The energization of the printing control magnets may be controlled directly by the sensing means upon detection of the control representations on the film record, and due to the synchronization of the type bar travel with the passage of the control spots by the sensing station will present the type elements 282, corresponding to the data control spots, in printing position.

Associated with each type bar 278 is a printing hammer 285 which is positioned to strike the type elements 282 which are now in printing position to effect printing therefrom. The printing hammers are actuated immediately after the positioning of the member 276 to the upper extremity of its movement. The detailed operation of the printing mechanism just described is well known and also is completely described in the said last mentioned patent, so that further disclosure of this mechanism is deemed unnecessary.

In addition thereto, control cams 256 to 259 inclusive are secured to shaft 241 and rotated thereby to operate the suitably disposed contacts C—2 to C—5 for various control purposes to be described hereinafter. An additional cam member 260 is provided and secured to said shaft to operate the associated controlled contacts C—1. The said cam member is provided with a plurality of suitable camming surfaces capable of operating the said associated contacts each time the film is advanced to present to the sensing station a different incremental area of the film record wherein one or more of the control spots may appear upon the film record. The different control spots are disposed in the proper position in each individual frame of the film record so as to maintain the timing arrangement described between the said areas where control spots may appear on the film and the cam member 260; secured to shaft 241 and insulated therefrom are a pair of electrically connected brushes 310, one brush engaging the individual conducting segments 311 while the other brush engages the common arcuate conducting strip 312. The timing of this emitter device E—1 is such that a brush 310 successively engages each of the segments 311 during each sensing interval.

Operation of the machine

Referring now to Figs. 6 and 6A (arranged as shown in Fig. 8A), the different control circuits established by the analyzation of the controlling photographic film record will be explained. Assuming that the film record has been positioned in the film advancing mechanism and also has been positioned in proper frame alignment, the line switches 335 are then closed to complete circuits to the drive motor 217 and the light source 210. Operation of the motor causes the various driving connections to rotate as described hereinabove. When the machine is in the normal "D" position (see Fig. 7), no control representations are present at the sensing station; therefore, the rays of light directed to the apertures in the guide plates 225 are conducted by the quartz rods to the associated light responsive cells 211 to activate them, controlling the amplifying units 212 (assuming that the proper potentials are applied to the control elements of the amplifying unit). The said amplifying units may be of any known construction and arranged so that when the said light responsive cells 211 are activated, the grid elements of the amplifying units are biased to such a degree that substantially no current flows in the output circuit of the said units. Under these conditions the relays A—1 to A—6 included in the respective output circuits of the amplifying units remain deenergized. It is realized now that whenever a control representation is presented to the sensing station to interrupt the light rays, that is, to prevent the light rays to impinge on the light responsive means 211, the corresponding amplifying units are conditioned to permit current to flow in the associated output circuits thus energizing the relays A—1 to A—6 included in the said output circuits.

Now assume that the print control switches 341 and 342 are in the "off" position and the start key is operated to close the associated contacts 336 to complete a circuit as follows: From one terminal of the supply source via conductor 337 through normally closed contacts 338 of the stop key, contacts 336, common conductor 339 through: (1) the coil of relay R—1 to the other terminal of the supply source via conductor 340, energizing said relay, (2) the film feed clutch magnet 229 to conductor 340, energizing said magnet, (3) the said print switches 341 and 342 through the clutch magnet 272 to conductor 340, energizing the said magnet. Energization of the film feed clutch magnet 229 is effective to release the dog member 232 thereby causing the shafts 220 and 221 to rotate and advance the control representations on the film record to the sensing station. Film feeding continues as long as the said control magnet 229 remains energized. A holding circuit for relay R—1 is established through contacts 338, contacts F—2 and contacts R—1a thus maintaining the said relay and clutch magnet 229 energized until the contacts 338 or F—2 are opened. Energization of the clutch magnet 272 is effective to release the dog member 273 to rotate the printing cam 270 and operate the associated mechanism as long as the said magnet remains energized.

Now that the machine is conditioned as described to render operative the various driving connections, the film feeding mechanism is effective to advance the differentially positioned control representations disposed on the film record to the sensing station for analyzation, and also at the same time the accumulating and printing control driving connections are operated in synchronism with the film feeding mechanism so that upon conditioning of the control circuits by the detection of any desired control representations the said accumulating and printing means are rendered operative at differential times to accumulate and/or print the data in accordance with the data control representations sensed.

The said operations should be understood at this time from the foregoing description; however, the control circuits conditioning the machine for controlling directly the accumulating and printing units by means of the film record will now be described briefly. Certain features included in the description to be set forth are disclosed and described in detail in the co-pending application Serial No. 207,281, filed May 11, 1938, and are claimed therein.

Upon presentation of the data representations to the sensing station, the light rays influencing the corresponding light responsive cells are intercepted or blocked so that the said cells 211 are effective at such times to condition the associated amplifying units 212 to become conductive, or stated in other words, the said units are conditioned so as to permit current to flow in the associated output circuits, thereby causing the corresponding relays A—1 to A—6 to be energized as long as the light rays are intercepted.

Energization of the relays A—1 to A—6 is effective to close the corresponding control contacts A—1a to A—6a. Now assume that it is desired to effect statistical operations in accordance with the data representations present in certain of the rows or columns on the film record adapted to condition the corresponding control circuits including the relays A—1 to A—3. Assume also that it is desired to add and print the corresponding data sensed; therefore, for these conditions the machine should be plugged so that the control contact plug sockets numbered 1, 2 and 3 are connected individually to the adding magnet plug sockets numbered 58 to 60 respectively and also to the printing magnet plug sockets 51 to 53 respectively.

It is now understood that with the described circuit conditions, whenever control representations in the said selected rows or columns are presented to the sensing station to intercept the light rays, the corresponding light responsive cells 211 are effective to condition the associated amplifier units 212 to permit current to flow in the output circuits thereof, thereby energizing the relays A—1 to A—3 and effecting closure of the associated contacts A—1a to A—3a at the particular time intervals the light control representations intercept the light rays. Closure of the said contacts is effective to initiate differentially timed control impulses in accordance with the control data sensed by virtue of establishing the following circuits: Conductor 337, cam controlled contacts C—1 (see Fig. 7), contacts A—1a to A—3a, conductors connecting said plug sockets, adding magnets 213 of the accumulator and printing magnets 214 to conductor 340.

The said control magnets 213 and 214 are energized at the particular and differential time intervals the data representations are sensed thus rendering the said magnets effective to control the adding and printing means to add and print the data in accordance with the control data sensed on the film record. Energization of the control magnets 213 causes the clutch elements 242 to be tripped to displace the index wheels 250 and readout brushes 252 accordingly; and energization of control magnets 214 causes the pawls 281 to be tripped to interrupt further travel of the type bars thus positioning the proper type element opposite the printing platen for an imprinting operation.

It is obvious, of course, that the machine may be conditioned by the plug connections for adding only and for printing only by omitting either of the plug connections to the respective control magnets.

Assume now that the contact plug sockets are connected individually to the subtracting control magnets 301 and that the cam controlled contacts C—2 are connected to the adding control magnets 213 and the elusive one control magnet 305 as shown in Fig. 9 and assuming that a series of individual groups of control representations are presented continuously to the sensing means, the following control circuits are established to control subtractively the accumulating means. It is seen that at the beginning of each machine cycle the cam controlled contacts C—2 are closed to establish a circuit from conductor 337 through said contacts and the conductors connecting plug socket 25 to plug sockets 58 to 60 (see Fig. 9) to the adding control magnets 213 to the conductor 340 thus energizing said magnets to trip the clutch elements 242 and effecting displacement of the index wheels 250 as though nines were added in each position. Upon presentation of the spot control representations to the sensing station to intercept the light rays, the corresponding light responsive cells 211 are effective to condition the associated amplifier units 212 to cause operation of the controlled relays A—1 to A—3. Closure of the corresponding contacts A—1a to A—3a at the particular time intervals the said representations intercept the light rays cause the subtracting control magnets 301 to be energized to effect de-clutching of the adding control mechanism in accordance with the differential positioning of the representations. These control circuits can be traced as follows: conductor 337, contacts C—1, A—1 to A—3, conductors connecting plug sockets 1—3 to plug sockets 64—66 (Fig. 9), magnets 301 to conductor 340. Energization of the control magnets 301 causes the associated dogs 293 to be released and engage the corresponding driving elements 291 thereby rotating the cams 294 thus positioning arm 244 in a de-clutching direction. In this manner the nines complement of the sensed data is added to the accumulating means. The elusive one is entered into the units order of the accumulating means independently by means of the control magnet 305, which is energized at the beginning of the machine cycle upon closure of the said contacts C—2 to trip the pawl carrying arm 308 so that during the carrying period the pawl 309 associated with the units order is effective to advance the units wheel one step, thus effecting a change of the nine complement to a ten complement.

*Automatic control operations*

The methods for effecting automatically various control operations of the machine will now be explained. For example, it may be desired to control selectively the same accumulating mechanism so as to be operated additively or subtractively in accordance with certain of the spot control representations presented to the sensing means, that is, it may be desired to add into the accumulator means the data represented by the control representations with the exception of certain predetermined groups or sets of control representations and subtract the latter from the amount set up in the said accumulator; or it may be desired to add to the accumulator the data represented only by certain predetermined groups of control representations and subtract therefrom the data represented by certain other predetermined groups of control representations. It will be obvious from the description to follow that many other results and combinations may be effected which are intended to be encompassed in the present invention.

The method for effecting the above-mentioned results comprises first sensing the data representations and comparing the sensed data with predetermined data retained or stored in suitable settable means, then controlling selectively, during a later machine cycle, certain control circuits in accordance with the data sensed, depending on the condition whether or not the sensed data and said predetermined data agree.

The control elements provided to effect conditioning of the said control circuits in accordance with the sensed data at a later timed interval will now be described.

Figure 5:
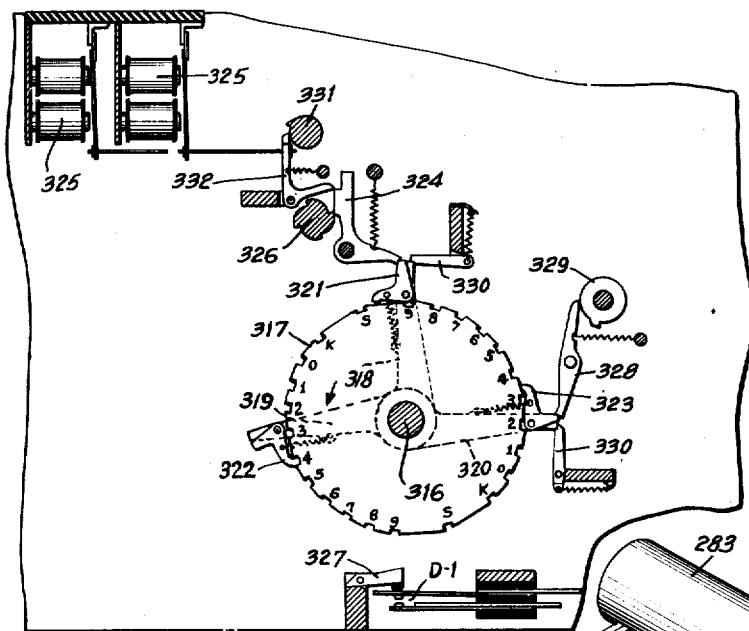
Fig. 5 is a diagrammatic view showing the storing means adapted to be controlled by the film control records.

Referring now to Figs. 2 and 5, it is seen that the driving connections 219 rotate the associated gear 315 and shaft 316 whenever the film feeding mechanism is rendered operative. The said shaft is driven at a definite rate relative to the movement of the film record and carries cycle wheels 317, which are secured thereto (one for each desired row or column of control representations), having two sets of notches, each corresponding to the positions for the control representations in any given row or column of the film record, and these wheels make one complete revolution during the period required to advance two consecutive groups or sets of control representations past the sensing station. The "D" position of the wheels 317 is shown in Fig. 5.

On the shaft 316 are loosely mounted three arms 318, 319 and 320 to each of which is pivoted a spring actuated dog 321, 322 and 323, one end of which fits into any one of the notches in the wheel 317, and the other projects radially outward along the arm, and assuming, for the moment, that dog 321 in engagement with a notch in the wheel has been brought by the movement of the latter into engagement with the lever 324 while in its latched position, it is upset or thrown out of engagement with said wheel and stops in the position indicated in Fig. 5.

The movement of the parts is so timed that at the time a control representation of a given value is passing the sensing station to effect energization of the magnets 325, a notch in wheel 317 of corresponding value will be under the dog 321. The energization of said magnet will, therefore, permit the engagement of the dog with the notch in the wheel 317 which corresponds in value to the then passing control representation on the film record. If no control representation in a given row or column is on the film record, the K notch will be engaged by the dog under conditions to be hereinafter referred to. After engagement, the arm 318 is carried in the direction shown by the arrow and moving in unison with the wheel.

A cam wheel 326 is constantly rotated by suitable gearing (not shown) which may be cooperating with gear 315, and it has a number of teeth or points which knock back the lever 324 and relatch it before the next notch has come into position and before certain contacts D—1 to D—6 are operated. These contacts are arranged to be operated at the same instant that the correspondingly numbered index point position on the film record is passing the sensing station.

Following the locked dog in its travel with the wheel 317, it reaches at a given time the contacts D—1 and the end of the arm 318 engage a lever 327, operating these contacts, namely, closing contacts D—1. The said arm being still locked by its dog, continues its movement to the point in which dog 323 is shown, where it encounters a latch lever 328 and is thrown out of engagement with the wheel 317. Here it rests until a cam 329 revolved by any suitable gearing in the machine unlatches lever 328 and allows the dog to engage with an S notch in the wheel 317 by which it is carried on to the starting point where it is again unlocked by the lever 324.

Considering now the other arms 319 and 320 and their dogs 322 and 323, each one goes through the same operations as described, but successively. That is to say, while dog 321 is unlocked and stationary, the arm 319 is being carried down to the contacts D—1 and the dog 323 is being carried up to the latch 328, where it will rest until the S notch on the wheel comes under it, when it is tripped by the cam 329. Associated with the levers 324 and 328 are lock latches 330 which engage the arms after they have been freed from the wheel and prevent any backward movement of the same.

If no control representation is in a given row or column the corresponding magnet 325 will not be energized and under these conditions the uppermost dog 321 must be released to engage the K notch. This is effected by knock-off cam 331 rotated by any suitable gearing so that the high point engages the latch lever 332 and withdraws it from engagement with the lever 324, once near the end of each cycle.

The cams 326, 329 and 331 referred to are driven by suitable gearing which in turn can be driven by gear 315 (Fig. 2) or by a similar gear secured to shaft 316. The relative timing of the cams with respect to the operation of the wheels 317 and associated dogs 321 to 323 has been set forth hereinabove.

*Data comparing method.*—Referring now to Figs. 6 and 6A (arranged as shown in Fig. 8A) and Fig. 7, a plurality of manually settable devices S—1 to S—12 are shown diagrammatically, each comprising a common conducting strip or ring 345 and a plurality of individual conducting segments 346 which are electrically connected to the said common ring by means of the positionable connector brushes 347. The said manually settable devices are similar in construction to the readout devices shown in Fig. 4 of U. S. Patent 1,976,617. The individual conducting segments of all the said devices are connected to the individual segments 311 of emitter E—1. Now assume that certain predetermined data are represented or stored in the settable devices S—1 to S—3 due to the differential positioning of the connector brushes, and assume that this said predetermined data is to be compared with certain classification data represented by the control spot indications disposed on the film record and effective upon sensing thereof to control the operations of relays A—1 to A—3, and further assume that the individual plug sockets 1 to 3 are connected to plug sockets 70 to 72 respectively.

Upon presentation of the groups of the classification spot representations to the sensing station, the relays A—1 to A—3 are controlled by the associated light responsive means and amplifier units in exactly the same manner as described hereinabove, so as to be energized upon interception of the light rays by the said spot representations. It will be seen therefore, that upon energization of the said relays and closure of the associated contacts A—1a to A—3a that whenever the said data sensed is in agreement with the data set up in the devices S—1 to S—3, the corresponding CR—1 to CR—3 relays are energized, due to the synchronous operation of the emitter E—1 and the film record feeding means. The control circuits established under these conditions are as follows: Conductor 337, contacts C—1 (see Fig. 7), contacts A—1a to A—3a, conductors connecting the plug sockets 1—3 to plug sockets 70—72, pickup coils of CR—1 to CR—3 relays, settable devices S—1 to S—3, emitter E—1 to conductor 340, energizing said relays, thus effecting closure of the contacts CR—1a to CR—3a. Holding coils are provided for the said relays and are designated CRH—1 to CRH—3 which are now energized as follows: Conductor 337, contacts C—5 (see Fig. 7), contacts CR—1a to CR—3a, holding coils CRH—1 to CRH—3 and conductor 340. The relays CR—1 to CR—3 are maintained energized until contacts C—5 open near the end of the machine cycle. Contacts CR—1b to CR—3b are also closed upon operation of the said CR relays to establish the following circuit near the end of the machine cycle: Conductor 337, contacts C—4 (see Fig. 7), contacts CR—1b to CR—3b, coil of relay R—2 and conductor 340, energizing said relay, and operating the associated contacts R—2a and 2b. A holding circuit for the said relay is established through contacts R—2a as follows: Conductor 337, contacts C—3 and R—2a, coil of relay R—2 to conductor 340, and by means of contacts C—3 (see Fig. 7) is maintained energized until near the end of the following machine cycle.

*Selective control methods.*—Now assume that the circuits shown in Figs. 6 and 6A are connected as indicated in Fig. 10 and that it is desired to control the accumulator means selectively in accordance with predetermined classification data disposed on the film record. Assume the classification data to be disposed in columns 1 to 3 (see Fig. 1) and the amount data to be entered in the accumulator means disposed in columns 4 to 6, and that the data in the first mentioned columns are effective to control the operation of relays A—1 to A—3 and the data in the second mentioned columns effective to control relays A—4 to A—6. The said assumptions regarding the disposition of the classification and amount data is not to be confused with the data shown disposed in certain columnar areas of the film record shown in Fig. 1. It is understood that such data can be disposed in any desired columnar areas. In the said figure certain disposition of certain data, which is related to the document facsimiles thereon, is shown, whereas an assumption is now made altering the disposition of the classification and amount data which is done to simplify the description to follow.

Continuing now with the description, closure of contacts R—2b establishes a circuit from conductor 337 to contacts R—2b, conductor connecting plug sockets 39 and 35 (see Fig. 10) to coil of relay R—7 and conductor 340, energizing said relay, thus operating contacts R—7a to R—7f.

Due to the closure of contacts R—7a to R—7c, circuits are established from plug sockets 22 to 24 to plug sockets 16 to 18 by means of the connecting conductors shown in Fig. 10 through the normally closed contacts R—3a to R—3c thus connecting the adding control magnets 213 to the delay contacts D—1 to D—3.

It was explained hereinabove how the energization of magnets 325 is effective to control the operation of the said contacts D—1 to D—3 during the following machine cycle. In the present illustration the energization of said magnets 325 is controlled directly by the closure of contacts A—4a to A—6a and the contacts C—1 (see Fig. 10). It is now seen that as the various groups of data representations are presented to the sensing station that the operation of the relays A—1 to A—3 are controlled by the classification data represented in columns 1 to 3 which in turn is compared with the predetermined data set up in the settable devices S—1 to S—3 to control the operation of relays R—2 and R—7 to establish circuits between the delay contacts D—1 to D—3 and the adding control magnets 213 in the event that the sensed data and preset data agree, and that the said circuits are maintained energized for the following machine cycle due to the timing of operation of the cam controlled contacts C—3, C—4 and C—5 (see Fig. 7).

It is also seen that under the conditions just described the amount data representations disposed in columns 4, 5 and 6, and forming part of the group of representations of which the class data agreed with the preset data, are effective to operate relays A—4 to A—6 and the contacts A—4a to A—6a to energize the corresponding magnets 325 thus storing the sensed data for a machine cycle and thereafter control the operation of the associated delay contacts D—1 to D—3 in accordance with the data representations sensed to control the operation of the adding control magnets 213 (through the circuits conditioned and described when the sensed and preset data agree), thus effecting entry into the accumulator means of the selected amount data representations.

It is obvious that if it is desired to print or list the selected amount data instead of entering the data into the accumulator mechanism, that the plug connections from sockets 16 to 18 may be connected to the printing control magnets 214 instead of the adding control magnets 213. In this event it is desirable to prevent spacing of the record sheet except when printing. To this end, additional control circuits are provided so as to control the printing means clutch control magnet 272 through contacts R—7g. The control switch 341 is then set in the "on" position, therefore whenever the sensed classification data and preset data agree relay R—7 is operated as described hereinabove and operation of contacts R—7g is effective to complete a circuit from conductor 337, through stop key contacts 338, contacts F—2 and R—1a, switch 341, contacts R—7g and R—8d to the clutch magnet 272 and conductor 340 thus operating the printing mechanism only when the class data agrees with the preset data.

It will now be shown how the amount data disposed on predetermined film records are entered selectively into the data accumulating means; for example, whenever the classification data on the film records is compared with the data stored in the said settable devices and are found to be in agreement control circuits are established to prevent entry of the related amount data on the said film records. By referring to Fig. 11, it is seen that the circuit connections are somewhat similar to those of Fig. 10 with the exception of the connections from plug sockets 13 to 15 to the adding control magnets by means of plug sockets 58 to 60. Due to this change in circuit connections the data sensed in columns 4, 5 and 6 is permitted to control the operation of the adding control magnets 213 as long as the data sensed in columns 1, 2 and 3 and the preset data disagree by virtue of the following circuits: Conductor 337, contacts C—1, contacts D—1 to D—3, conductors connecting the plug sockets 7—9 and plug sockets 22—24 shown in Fig. 11, contacts R—7d to R—7f which are normally closed, normally closed contacts R—6a to R—6c, conductors connecting plug sockets 13—15 and plug sockets 58—60 shown in said figure, control magnets 213 to conductor 340. As long as the compared data disagrees the circuits just traced are maintained, however upon agreement of the compared data, the control circuits for relays CR—1 to CR—3 are energized (these circuits have been traced hereinabove and therefore are not repeated at this time) to energize relays R—2 and R—7. As explained hereinabove energization of relay R—7 is effective to open contacts R—7d to R—7f and close contacts R—7a to R—7c, thereby opening the control circuits leading to the control magnets 213 thus preventing energization of the said magnets at such times whenever the compared data agrees. In this manner entry of the amount data in the accumulating means is suppressed whenever the class data representations agree with the data set in the settable device.

Printing or listing of all of the amount data sensed except data of certain predetermined groups instead of controlling the accumulating means thereby, can be effected by connecting the control circuits to the print control magnets 214 instead of the magnets 213 from the plug socket 13 to 15. A circuit is provided to prevent spacing of the record sheet when not printing and is as follows: With switch 341 in "off" position and switch 342 in "on" position, a circuit from conductor 337 is established through contacts 339, F—2, and R—1a, switch 341, contacts R—7h to clutch magnet 272 and conductor 340 to energize said magnet as long as the compared data disagrees. Upon agreement thereof relay R—7 is energized to open contacts R—7h thus preventing further operations of the printing mechanism including the record sheet spacing mechanism.

The description up to now regarding the automatic control operations has been limited to comparing but one group of class data representations. It was mentioned hereinbefore that a plurality of manually operated settable devices S—1 to S—12 are provided. It will now be seen that a plurality of these devices may be connected in multiple and thus be effective to control or compare two or more independent groups of class data representations. Assume that it is desired only to control or compare on three columns of classification data representations, thus the groups of settable devices "A," "B," "C," and "D" could be conditioned to compare four independent groups of classification data. Whenever desired two or more of the said groups of devices may be connected in multiple (see the circuit connections in Fig. 12). In Fig. 12 the remaining circuits are connected as shown in Fig. 10 and described hereinabove; so that comparing of the classification data is now effected by comparing the data set up in the group of devices "A," "B," "C," and "D." Considering further the circuit connections connected as shown in Fig. 12, it is seen that data entry in the accumulator and/or data printing is suppressed not only when the classification data sensed agrees with the data set up in device "A," but when the said data sensed agrees with the data set up in any one of the devices "A," "B," "C" and "D."

*Controlling data accumulating means additively and subtractively.*—It will now be described how all the amount data representations sensed except those representations disposed in certain predetermined groups are effective to control additively the accumulating means and how the said data representations of the certain predetermined groups are effective to control subtractively the same accumulating means. Briefly and broadly, this result is accomplished by comparing the class data representations with the predetermined set up data, and in the event the compared data disagrees control circuits are conditioned to add the amount data to the accumulator means; in the event the compared data agrees different control circuits automatically are conditioned to subtract such amount data from the said accumulator means.

The detailed description of the method embodied herein will now follow and reference should be made to Figs. 6 and 6A (the circuits shown therein connected as indicated in Fig. 13). Similarly, as described hereinabove, the class data sensed in columns 1, 2 and 3 are effective to control the operation of relays A—1 to A—3, thus controlling the operation of contacts A—1a to A—3a which are connected directly to the set up devices S—1 to S—3 designated group "A." In the event the class data sensed disagree with the data set up in the said devices, no circuits are completed to energize the connected relays CR—1 to CR—3. During the said conditions, relay R—2 remains deenergized, because the series circuit comprising in part the contacts CR—1b to CR—3b is not completed. Therefore, relay R—6 remains deenergized by virtue of the open contacts R—2b. Thus, it is seen that the control circuits established for the data accumulating means is as follows: From conductor 337 to contacts C—1, contacts A—4a to A—6a, conductors connecting plug sockets 4—6 to plug sockets 45—47 shown in Fig. 13, magnets 325 to conductor 340, energizing said magnets in accordance with the amount data sensed. The associated and corresponding contacts D—1 to D—3 are operated during the following machine cycle to establish a circuit from conductor 337 to contacts C—1, said contacts D—1 to D—3, conductors connecting plug sockets 7—9 to plug sockets 22—24 as shown in Fig. 13, contacts R—7d to R—7f via conductors 358 to 352, contacts R—6a to R—6c to the adding control magnets 213, energizing said magnets thus effecting entry of the amount data sensed into the accumulator means. Therefore, it is seen that the said accumulator means is controlled additively by the sensed data as long as the compared data disagrees.

However, upon agreement of the compared data, a circuit is completed from conductor 337 to contacts C—1, contacts A—1a to A—3a, conductors connecting plug sockets 1—3 to plug sockets 70—72 shown in Fig. 13, to coils of relays CR—1 to CR—3, devices S—1 to S—3, emitter E—1 to conductor 340 energizing the said relays. Closure of contacts CR—1b to CR—3b permits a circuit to be established upon completion of sensing the said data representations through contacts C—4 to energize relay R—2, closing contacts R—2b thereby causing relay R—6 to be energized. Energization of the last mentioned relay causes contacts R—6a to R—6c to be opened and contacts R—6d to R—6j to be closed. It has been explained how, by means of the timed cam contacts, the last mentioned conditioned circuits are maintained during the following machine cycle, so that the stored data is effective, by means of contacts D—1 to D—3, to control the accumulating means. The differentially timed impulses initiated by the contacts D—1 to D—3 are impressed upon the circuits 353 to 355 and by means of the plug connections (see Fig. 13) to the subtracting control magnets 301, energizing said magnets at different intervals in accordance with the sensed data to effect subtracting said data from the accumulator entries. It should be mentioned that by means of contacts C—2 and contacts R—6j the elusive one magnet 305 is energized at the beginning of the machine cycle to effect entry of the elusive one, and also provision is made at the beginning of the machine cycle to trip the adding control magnets 213 in accordance with the method of subtraction described and embodied herein, by means of the following circuit: From conductor 337 to contacts C—1, contacts C—2, conductor connecting plug socket 25 to plug socket 26 shown in Fig. 13, contacts R—6g to R—6i, normally closed contacts R—8a to R—8c to the adding control magnets 213 by means of the conductors connecting plug sockets 16 to 18 to plug sockets 58 to 60 (see Fig. 13). In this manner the sensed amount data is effective to control subtractively the accumulating means at certain predetermined times while at other times the same accumulating means is controlled additively by the sensed amount data.

In view of the description thus far, it is understood that various selective operations may be effected depending upon the initial conditioning of certain of the control circuits. For example, it may be desired to have all the amount data representations sensed except those of predetermined groups control additively the accumulating means and control the same accumulating means subtractively only in accordance with the amount data of certain ones of the said predetermined groups. Such results may be attained by multiple connections of the settable devices S—1 to S—12 as mentioned hereinabove. Assume that all the amount data sensed is to be added with the exception of such data included in the groups having class data in agreement with the setting of devices "A" and "B" comprising the individual set up devices S—1 to S—3 and S—4 to S—6 respectively, and furthermore that the amount data sensed in certain of the said groups having class data in agreement only with the setting of device "B" is to be subtracted. In this case the devices "A" and "B" are connected in multiple and the control circuits connected as indicated in Fig. 14. It will be seen that all the amount data sensed except the data included in the groups having class data in agreement with the preset data in devices "A" and "B" is effective to control additively the accumulating means in exactly the same manner as just described. However, when the class data agrees with the preset data in device "A" the control circuits to all control magnets of the accumulator means are opened by virtue of operation of R—2 (the specific circuits traced hereinbefore) and in turn the operation of relays R—7 and R—8. The latter are energized upon closure of the contacts R—2b through plug connections 39 to 35 and 43 to 44. Operation of relays R—7 and R—8 cause contacts A—7d to R—7f and contacts R—8a to R—8c to open, thus preventing operation of the control magnets of the accumulating means. When the class data agrees with the preset data in device B, relays CR—4 to CR—6 are energized to operate the contacts CR—4b to CR—6b thus causing relay R—3 to be energized and the contacts R—3b to be operated. Operation of contacts R—3b causes relay R—6 to be energized by means of the plug connections 40 to 32 thus opening contacts R—6a to R—6c and closing contacts R—6d to R—6j. As mentioned before by means of contacts C—2 the add control magnets 213 are energized at the beginning of the machine cycle as if to enter nines in the accumulator means and the elusive one control magnet 305 of the said accumulator means is energized at this time to effect entry of the elusive one. Thus, it is seen that the timed impulses initiated by the contacts D—1 to D—3 are impressed now upon the circuits 353 to 355 to control the operation of the subtract control magnets 301 and in this manner control the accumulator means subtractively in accordance with the amount data sensed, the class data of which is in agreement with the preset data of device "B."

Now assume that it is desired only to add certain predetermined groups of amount data to the accumulator means and subtract other predetermined groups of amount data from the said accumulator means, and that the class data of the data to be added corresponds to the data set up in devices "A" and the class data of the data to be subtracted corresponds to the preset data in devices "B." For this method of selective control the circuits are connected as indicated in Fig. 15. The class data is compared with the preset data in devices "A" and "B" by means of the circuit connections from the contacts A—1a to A—3a to the said devices connected in multiple to control the operation of the relay R—2 when the class data agrees with the preset data of device "A" and the operation of relay R—3 when the class data agrees with the preset data of device "B."

Operation of relay R—2 and the contacts R—2b cause energization of relay R—7 closing contacts R—7a to R—7c and thereby the timed impulses initiated by contacts D—1 to D—3 are impressed on circuits 350—352, contacts R—1a to R—7c, conductors connecting plug sockets 16—18 to plug sockets 58—60 shown in Fig. 15, and the control magnets 213, controlling the accumulator means additively in accordance with the sensed data.

Operation of relay R—3 and contacts R—3b is effective to energize relay R—6 thus causing (1) the energization of the adding control magnets 213 as though to effect entry of nines in the accumulator means through the contacts R—6g to R—6i and C—2, (2) the energization of the elusive one control magnet 305 through contacts R—6j, (3) the energization of the control magnets 301 through the contacts R—6d to R—6f by means of the impulses initiated by contacts D—I to D—3 thus controlling subtractively the accumulator means in accordance with the amount data sensed. In the manner just described the accumulating means is controlled selectively, that is additively or subtractively, in accordance with the class data sensed.

In view of the detailed description just set forth explaining certain selective operations of the machine, it is believed that the following brief description of additional selective machine operations are sufficient.

*Controlling data accumulating means selectively and listing selectively.*—It will now be shown how the accumulating means may be controlled additively and/or subtractively and in addition thereto effecting listing or printing of the amount data selectively and separately in accordance with the different class data sensed. For example, to add the amount data of certain predetermined groups in the accumulator means and list the said data in one column on the record sheet and list all the other amount data in another column on the record sheet, connect the circuits shown in Figs. 6 and 6A as indicated in Fig. 16. Now, as long as the class data disagrees with the preset data of device "A," the timed impulses initiated by the contacts D—I to D—3 are impressed on the circuits 350 to 352 and the control magnets 214 (associated with plug sockets 54 to 56) through the contacts R—6a to R—6c thus effecting listing in a certain column of the amount data sensed. However upon agreement of the class data sensed and the preset data of device "A," the relays CR—I to CR—3 are effective to permit energization of relay R—2 thus operating contacts R—2b and relay R—7. While the circuits are conditioned accordingly, the timed impulses initiated by contacts D—I to D—3 are impressed upon circuits 350 to 352 to energize the add control magnets 213 and other list control magnets 214 (associated with plug sockets 51 to 53) through contacts R—7a to R—7c and R—8a to R—8c, thus effecting entry of the selected amount data in the accumulator means and listing the said data in a column apart from the first mentioned listed data.

*Controlling data accumulating means additively and subtractively, listing all the amount data sensed and indicating the subtracting operations.*—The circuit connections are connected as indicated in Fig. 17 to attain this result, and upon examination it is seen that the circuits are conditioned similarly as shown in Fig. 13, with the exception of the additional-lasting circuit arrangements. All the amount data sensed except the amount data included in the groups having class data in agreement with the present data of device "A" is effective to control additively the accumulator means as follows: As long as the class data is dissimilar to the present data relay R—6 remains deenergized. Consequently, the timed impulses initiated by the contacts D—I to D—3 are impressed upon circuits 350 to 352 to energize the add control magnets 213 via contacts R—7d to R—7f and R—6a to R—6c. At the same time the said impulses are impressed upon certain print control magnets 214 due to the direct connections from plug sockets 7—9 to 51—53 thus controlling additively the accumulator means in accordance with the amount data and effecting listing of the said data. Upon agreement of the compared class data, relay R—6 becomes energized in a manner described hereinbefore. The timed impulses initiated by contacts D—I to D—3 are then impressed upon circuits 353—355 and the subtract control magnets 301 to control the accumulator means accordingly. It is understood that the said accumulator means is conditioned at the beginning of the machine cycle for subtraction operations by means of the circuits conditioned by contacts C—2 through contacts R—6g to R—6i and R—8a to R—8c and magnets 213, and the circuit conditioned by contacts R—6j to energize the elusive one magnet 305. Listing again is effected by the direct connections from the list magnet to the D—I to D—3 contacts. To indicate the fact that certain amount data is subtracted an additional print control magnet 214—a (Fig. 6) is provided to control a type bar in exactly the same manner as the type bars 278, however, a special indication such as an asterisk may be provided in the "9" position of the type bar, thus printing an indicating mark opposite the amount data subtracted. The control magnet 214—a associated with plug socket 57 is connected directly to plug socket 27 so as to be energized at the beginning of the cycle by a "9" impulse through the C—2 contacts, thus it is seen that, whenever the circuits are conditioned to control subtractively the accumulator means and to list the data entered therein, an individual indicating mark such as an asterisk is printed opposite the listed data thereby indicating on the printed sheet that such data was entered subtractively in the accumulating means.

In some cases it may be desired to add and list only certain predetermined amount data and subtract and list other predetermined amount data and print an indicating mark opposite the amount data subtracted and listed. For such machine operations the circuits are connected as indicated in Fig. 18 whereby the amount data having class data in agreement with preset data of device "A" is added and listed and the amount data having class data in agreement with preset data of device "B" is subtracted, listed and identified accordingly.

Assume switch 341 to be in the "on" position. When the class data and preset data of device "A" are in agreement relay R—2 is operated to energize relay R—7 and close contacts R—7a to R—7c, and thereby the timed impulses initiated by contacts D—I to D—3 are impressed on circuits 350—352 and the add control magnets 213 via contacts R—8a to R—8c. Listing of all the amount data sensed in said predetermined groups is effected by control magnets 214 which are connected directly to the contacts D—I to D—3. It should be noted in this operation that control of the print clutch magnet 272 is effected by the operation of contacts R—7g and R—6k thus printing of the data can only be effected whenever the class data is in agreement with the preset or predetermined data. Now when the class data and preset data of device "B" are in agreement relay R—3 is operated to energize relay R—6 and the associated contacts. Thus the timed impulses initiated by contacts D—I to D—3 are impressed upon the circuits 353—355 and the subtract control magnets 301 via contacts R—6d to R—6f. The accumulating means is conditioned for subtraction operations by means of contact R—6g to R—6i and C—2 energizing the add magnets 213 via contacts R—8a to R—8c at the beginning of the machine cycle. By means of contacts C—2 and R—6j the elusive one magnet 305 is energized by a "9" impulse at the beginning of the machine cycle. Listing of the said data is effected at this time by the timed impulses initiated by contacts D—1 to D—3 since contacts R—6k and R—8d are closed to energize the print clutch magnet 272. Opposite the subtracted data listed is printed the special indicating mark due to the energization of the control magnet 214—a which is connected directly to socket 27 so as to be influenced by the "9" impulses during the subtractive control period.

*Controlling selectively a plurality of accumulating means and listing selectively.*—The description thus far limited the selective operations to a common accumulating means, in Fig. 16 it is shown that the add control magnets associated with plug sockets 55 to 59 and the subtract control magnets associated with sockets 64—66 comprise the control means of one accumulating means and the control magnets associated with sockets 61—63 and 67—69 comprise the control means of a second accumulating means (see Fig. 3). Assume that the circuits are connected as indicated in Fig. 19. When the class data is in agreement with the preset data of device "A" relays R—2 and R—7 are operated. The timed impulses initiated by contacts D—1 to D—3 are then impressed upon circuits 350—352 and the add control magnets 213 of accumulating means No. 2 via contacts R—7a to R—7c and R—8a to R—8c controlling the said accumulating means additively in accordance with the predetermined or selected amount data. As long as the compared data is in disagreement the relays R—2 and R—7 remain deenergized and thereby the timed impulses initiated by contacts D—1 to D—3 are impressed upon circuits 350—352 and the add control magnets 213 of accumulating means No. 1 via contacts R—7d to R—7f and contacts R—8a to R—8c.

In accordance with the operations described hereinbefore, it is evident that listing of the data sensed in separate columns may be effected. The plugging arrangement for such operations is indicated in Fig. 22. The list control magnets 214 are connected to plug sockets 13 to 18 which in turn are connected to the individual accumulator means so that when each accumulator means is controlled the corresponding list control magnets are rendered operative simultaneously therewith to list the data entered in the particular accumulator means.

In the event only certain predetermined amount data is to be entered in one accumulator means and certain other amount data in another accumulating means, the circuit connections are conditioned as indicated in Fig. 20. Therefore, when the class data is in agreement with the preset data of device "A," relays R—2 and R—6 are rendered operative so that the timed impulses initiated by contacts D—1 to D—3 are impressed upon circuits 353—355 and the add control magnets 213 of accumulating means No. 2 via contacts R—6d to R—6f thereby controlling said means additively in accordance with the amount data having class data in agreement with the preset data of device "A."

When the class data is in agreement with the preset data of device "B," relays R—3 and R—7 are energized so that the timed impulses initiated by contacts D—1 to D—3 are impressed upon circuits 350—352 to control the add control magnets of accumulating means No. 1 via contacts R—7a to R—7c and R—8a to R—8c, thus controlling the said particular accumulating means additively in accordance with the data having class data in agreement with the preset data of device "B."

Listing of the data entered in the individual accumulating means may be effected and selectively listed in separate columns by connecting the circuits as indicated in Fig. 23 so that the individual list control magnets 214 are controlled by the said timed impulses initiated by contacts D—1 to D—3 when the individual accumulating means are controlled. The said list magnets are connected in multiple with the add magnets to plug sockets 16 to 21.

Now assume that the amount data having class data in agreement with the preset data of device "A" is to be added in one accumulating means and that the amount data having class data in agreement with preset data of device "B" is to be subtracted from the said accumulating means and in addition thereto to add the selected data subtracted in another accumulating means. To effect such operations the circuits are connected as indicated in Fig. 21, so that when the class data is in agreement with the preset data of device "A," relays R—2 and R—7 are energized so that the timed impulses initiated by contacts D—1 to D—3 are impressed upon circuits 350—352 and add control magnets 213 of accumulating means No. 1 via contacts R—7a to R—7c and contacts R—8a to R—8c thus controlling the said accumulating means additively in accordance with the preset data of device "A."

Now when the class data is in agreement with the preset data of device "B" relays R—3 and R—6 are energized so that the timed impulses are impressed on circuits 353—355 and the subtract control magnets 301 of accumulating means No. 1 and the add control magnets 213 of accumulating means No. 2 via contacts R—6d to R—6f thus controlling accumulating means No. 1 subtractively and accumulating means No. 2 additively in accordance with the amount data having class data in agreement with the preset data of device "B." The accumulating means No. 1 is conditioned for subtracting operations as described hereinbefore, namely by tripping the add control magnets 213 and elusive one control magnet 305 of said accumulating means by "9" impulses by means of contacts C—2 and the circuits conditioned by contacts R—6g to R—6j and R—8a to R—8c.

*Summary*

It has been shown how a photographic film controlled statistical machine may be controlled selectively to perform different data manifesting operations depending upon the relative values of the classification data successively presented to the machine for analyzation.

It has been shown how the sensed data is stored in data storing elements for control purposes simultaneously with comparing the sensed data with selected predetermined data retained in manually settable devices by (1) conditioning light responsive means by modified light rays in accordance with the light modifying areas disposed on the film control records; (2) controlling by means of the conditioned light responsive means the energization of selected comparing circuits thereby controlling the selection of adding, subtracting and/or printing control magnets, and (3) controlling by means of the conditioned light responsive means the energization of data storing control magnets to effect storing of the desired control data which is then effective during a later cycle of the machine to control the operations of the selected data receiving control magnets.

It has been shown that the data accumulating means may be controlled additively and/or subtractively depending upon the relative values of the classification data, also that certain operations such as adding or subtracting the amount data may be effected if the compared data is in agreement and upon disagreement thereof subtracting or adding the data respectively. It has also been shown that the data accumulating means may be controlled additively when certain predetermined classification data is sensed and controlled subtractively when certain other predetermined classification data is sensed. In addition thereto, it has been seen that printing the selected amount data may be effected and that opposite certain of the listed data special indicating marks may be printed to indicate the type of entry made of said identified data in the accumulating means.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A cyclically operable record controlled machine comprising cyclically operating record feeding means, said records bearing amount and related classification data designations, a single sensing station having means thereat for sensing said designations on the records fed successively thereto, an individual record being sensed during a cycle of the machine, storage means controlled by the sensing means for setting up successively each cycle the representations of the amount data sensed on each record, an accumulator having adding control means and subtracting control means, a plurality of settable devices on which desired comparison data is set up, means under control of said sensing means and said settable devices for comparing the sensed classification data and comparison data during each cycle, a plurality of partially completed control circuits interconnecting the said adding and subtracting control means and storage means, controllable means, under control of the comparing means, having means for selectively effecting completion of certain of the said control circuits, during the said cycle, whenever the record classification data bears a predetermined relationship to the setup comparison data, thereby selecting certain of the said adding and subtracting control means of the accumulator and rendering them capable of being controlled by the storage means, and means included in said storage means for effecting energization of the completed circuits and control means of the accumulator, at different times during the cycle subsequent to the cycle during which the said classification data is sensed, in accordance with the data set up in the storage means, thereby effecting entries of the said setup data in the accumulator.

2. A cyclically operable record controlled machine comprising cyclically operating record feeding means, said records bearing amount and related classification data designations, a single sensing station having means thereat for sensing the said designations on the records fed successively thereto, an individual record being sensed during a cycle of the machine, storage means controlled by the sensing means for setting up successively each cycle the representations of the amount data sensed on each record, a plurality of data accumulating means, each accumulating means having adding and subtracting entry control means, a plurality of groups of settable devices on which desired comparison data is set up, one group of devices for each accumulating means, means under control of said sensing means and said settable devices for comparing the sensed classification data and comparison data during each cycle, a plurality of partially completed control circuits interconnecting the said entry control means and storage means, controllable means, under control of the comparing means, having means for selectively effecting completion of certain of said control circuits, during the said cycle, whenever the record classification data bears a predetermined relationship to the setup comparison data, thereby selecting certain of the adding and subtracting control means of the different data accumulating means and rendering them capable of being controlled by the storage means, and means included in said storage means for effecting energization of the completed circuits and selected entry control means of the data accumulating means, at different times, during the cycle subsequent to the cycle during which the said classification data is sensed, in accordance with the data set up in the storage means, thereby effecting additive or subtractive entries of the said set up data only in the selected data accumulating means.

JAMES W. BRYCE.